US009013607B2

(12) United States Patent
Taguchi et al.

(10) Patent No.: US 9,013,607 B2
(45) Date of Patent: Apr. 21, 2015

(54) OPTICAL INSTRUMENT, AND METHOD FOR OPTICAL INSTRUMENT FOR PREVENTING UNEXPECTED MOVEMENT

(75) Inventors: Yuzuru Taguchi, Tachikawa (JP); Manabu Ichikawa, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 206 days.

(21) Appl. No.: 13/527,276

(22) Filed: Jun. 19, 2012

(65) Prior Publication Data

US 2012/0327274 A1    Dec. 27, 2012

(30) Foreign Application Priority Data

Jun. 23, 2011    (JP) ................ P2011-139637

(51) Int. Cl.
| | |
|---|---|
| *H04N 5/262* | (2006.01) |
| *G03B 13/00* | (2006.01) |
| *H04N 5/232* | (2006.01) |
| *G02B 7/02* | (2006.01) |
| *G03B 3/00* | (2006.01) |
| *H04N 5/225* | (2006.01) |
| *G03B 3/02* | (2006.01) |

(Continued)

(52) U.S. Cl.
CPC ........... *G02B 7/023* (2013.01); *H04N 5/232* (2013.01); *H04N 5/2254* (2013.01); *G03B 3/02* (2013.01); *G03B 17/14* (2013.01); *G03B 17/18* (2013.01); *G03B 2206/00* (2013.01)

(58) Field of Classification Search
CPC ........... G02B 7/04; G02B 7/10; G02B 7/023; G03B 17/18; G03B 17/14; G03B 3/02; G03B 2206/00
USPC .......... 348/208.7, 240.99–240.3, 208.99, 348/208.11–208.12, 222.1, 333.01, 348/345–357; 396/137, 144–147, 76, 396/85–86; 359/823–827, 425, 611, 359/676–706
See application file for complete search history.

(56) References Cited

U.S. PATENT DOCUMENTS

| | | | | |
|---|---|---|---|---|
| 1,848,402 | A | * | 3/1932 | Wollensak .................. 359/739 |
| 4,841,370 | A | * | 6/1989 | Murashima et al. .......... 348/351 |

(Continued)

FOREIGN PATENT DOCUMENTS

| | | |
|---|---|---|
| JP | 2005-292325 | 10/2005 |
| JP | 2011-107395 | 6/2011 |

OTHER PUBLICATIONS

Notice of Rejection in corresponding Chinese Patent Application No. 201210212577.X mailed Sep. 10, 2014 (8 pgs.).

*Primary Examiner* — Pritham Prabhakher
(74) *Attorney, Agent, or Firm* — Straub & Pokotylo; John C. Pokotylo

(57) ABSTRACT

An optical instrument of the present invention comprises a ring member which is arranged to be rotatable with respect to a lens barrel, and also to slide in an optical axis direction, a movement mechanism for slide movement of the ring member to a first position or a second position in the optical axis direction, an encoder that generates signals in accordance with a rotation operation of the ring member, a slide position determination section for determining positional change accompanying slide movement to the first position or the second position by the movement mechanism, and a control section for performing determination of the signals from the encoder to switch the display operation, and prohibiting switching of the display operation when the slide position determination section has determined a positional change accompanying the slide operation.

8 Claims, 12 Drawing Sheets

(51) Int. Cl.
*G03B 17/18* (2006.01)
*G03B 17/14* (2006.01)

(56) References Cited

U.S. PATENT DOCUMENTS

| | | | |
|---|---|---|---|
| 6,967,794 B2* | 11/2005 | Luthardt et al. | 359/827 |
| 2002/0041334 A1* | 4/2002 | Okawara | 348/335 |
| 2005/0174459 A1* | 8/2005 | Naka | 348/333.01 |
| 2007/0147818 A1* | 6/2007 | Mori | 396/144 |
| 2007/0242940 A1* | 10/2007 | Yumiki et al. | 396/79 |
| 2009/0279192 A1* | 11/2009 | Harada et al. | 359/825 |
| 2010/0046085 A1* | 2/2010 | Yumiki et al. | 359/684 |
| 2010/0238321 A1* | 9/2010 | Honjo et al. | 348/231.99 |
| 2011/0043936 A1 | 2/2011 | Mori | |
| 2011/0200316 A1* | 8/2011 | Sugiura | 396/131 |
| 2012/0127332 A1* | 5/2012 | Park et al. | 348/222.1 |

\* cited by examiner

US 9,013,607 B2

OPTICAL INSTRUMENT, AND METHOD FOR OPTICAL INSTRUMENT FOR PREVENTING UNEXPECTED MOVEMENT

Benefit is claimed, under 35 U.S.C. §119, to the filing date of prior Japanese Patent Application No. 2011-139637 filed on Jun. 23, 2011. This application is expressly incorporated herein by reference. The scope of the present invention is not limited to any requirements of the specific embodiments described in the application.

BACKGROUND OF THE INVENTION

1. Field of the Invention

The present invention relates to an optical instrument having a ring member which is arranged to be rotatable with respect to a lens barrel, and also slidable in an optical axis direction, and to a control method for an optical instrument.

2. Description of the Related Art

There is known a lens barrel having a ring member, arranged in a zoom lens barrel that is capable of changing focal length, so as to slide in an optical axis direction, and also rotate around the optical axis, for carrying out manual focus adjustment by a rotation operation of this ring member, or carrying out change of focal length by slide operation of the ring member.

With a lens unit that is disclosed in Japanese patent laid-open No. 2011-43706 (laid-open Mar. 3, 2011), a click mechanism is provided for rotating with respect to a lens barrel and moving in an optical axis direction.

SUMMARY OF THE INVENTION

An object of the present invention is to provide an optical instrument that prevents unexpected movement at the time of switching modes even if there is instability in a photographer's hand movements, and a control method for an optical instrument.

An optical instrument of the present invention comprises: a ring member which is arranged to be rotatable with respect to a lens barrel, and also to slide in an optical axis direction, a movement mechanism for slide movement of the ring member to a first position or a second position in the optical axis direction, an encoder that generates signals in accordance with a rotation operation of the ring member, a slide position determination section for determining positional change accompanying slide movement to the first position or the second position by the movement mechanism, and a control section for performing determination of the signals from the encoder to switch the display operation, and prohibiting switching of the display operation when the slide position determination section has determined a positional change accompanying the slide operation.

An optical instrument of the present invention comprises a ring member which is arranged to be rotatable with respect to a lens barrel, and also to slide in an optical axis direction, a slide movement mechanism for slide movement of the ring member to a first position or a second position, a slide detection section for detecting slide movement of the ring member in the optical axis direction, and a rotation detection section for detecting rotation of the ring member, wherein when slide movement in the optical axis direction has been detected by the slide detection section, processing with respect to rotation of the ring member is not carried out for a specified period.

A control method for an optical instrument of the present invention, having a ring member which is arranged to be rotatable with respect to a lens barrel, and also slidable in an optical axis direction, comprises determining whether or not there has been rotational operation of the ring member, switching a display operation in the event that it is determined that there has been a rotational operation, determining whether or not there has been movement of the ring member in the optical axis direction, and prohibiting switching of the display operation in the event that it has been determined that there has been movement in the optical axis direction.

DETAILED DESCRIPTION OF THE PREFERRED EMBODIMENTS

Figure 1:
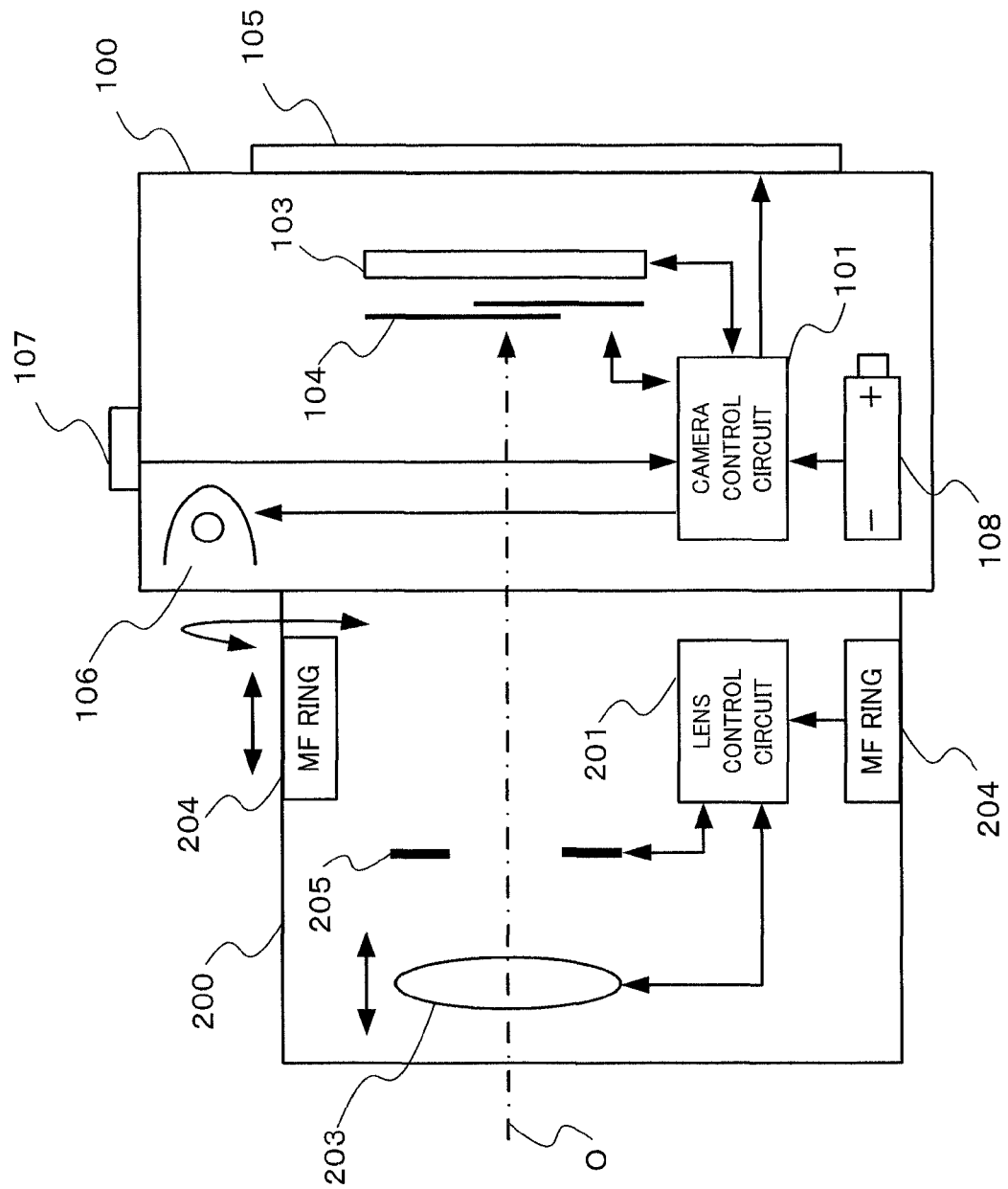
FIG. 1 is a block diagram showing the internal structure of a camera relating to one embodiment of the present invention.

Preferred embodiments using a camera to which the present invention has been applied will be described in the following in accordance with the drawings. FIG. 1 is a block diagram showing the structure of a camera relating to one embodiment of the present invention, and this camera is a digital camera comprising a camera body 100 and an interchangeable lens 200. The interchangeable lens 200 is removably attached to the camera body 110 by means of a bayonet mount. With this embodiment, the camera body 100 and the interchangeable lens 200 are constructed separately, but they may also be constructed integrally.

A camera control circuit 101, image sensor 103, focal plane shutter 104, display monitor 105, strobe unit 106, release button 107 and battery 108 etc. are arranged inside the camera body 100. Also, a lens control circuit 201, focusing lens 203, MF (Manual Focus) ring 204 and aperture 205 etc. are arranged inside or on the interchangeable lens 200.

The camera control circuit 101 is made up of an ASIC (application-specific integrated circuit) including a CPU (central processing unit) 121 (refer to FIG. 2) etc., and peripheral circuits of the ASIC. If a photographer operates the release button 107, the camera control circuit 101 controls the image sensor 103 and focal plane shutter 104 etc., as well as carrying out firing control of the strobe unit 106 as required, and executes shooting operations etc. by means of the lens control circuit 201. Various sequences for the entire camera are collectively controlled in collaboration with a lens CPU 221 (referred to FIG. 2) within the lens control circuit 201, which will be described later. This control is executed in accordance with programs that have been stored in a flash ROM 122 (referred to FIG. 2). Details of this camera control circuit 101 will be described later using FIG. 2.

The image sensor 103 is constructed using a solid-state image sensor such as a CCD (Charge Coupled Device) image sensor or a CMOS (Complementary Metal Oxide Semiconductor) image sensor, and converts a subject image that has been formed by the interchangeable lens 200 into image signals. Specifically, image signals are accumulated in the image sensor 103, or image signals are read out, in accordance with signals from the camera control circuit 101. An imaging section is constituted by the image sensor 103 and an image sensor control circuit 124 which will be described later. In this specification, signals based on output from the image sensor 103 may be referred to as image data as well as image signals.

The focal plane shutter 104 performs opening and closing operations in response to an instruction from a shutter control circuit 126 (referred to FIG. 2) within the camera control circuit 101, based on the release button 107 being pressed down fully, and opens and closes subject light flux from the interchangeable lens 200. The opening and closing time is a time corresponding to a shutter speed that has been calculated by the camera control circuit 101.

The display monitor 105 is constituted by an LCD or organic EL etc. arranged on the rear surface or the like of the camera body. The display monitor 105 carries out live view display at the time of still picture shooting standby and movie shooting, playback display of taken images that have already been stored in accordance with the operation of a playback button etc., and display of setting information on menus screen or the like in response to operation of a menu button etc. The display section is constituted by this display monitor 105 and a display circuit 128 which will be described later.

The strobe unit 106 irradiates supplementary light to a subject in accordance with a command from a strobe control circuit 125 (refer to FIG. 2) within the camera control circuit 101, in a case where the surrounding area is dark at the time of operation of the release button 107. This light emission is carried out in synchronization with an exposure operation of the focal plane shutter 104, using charge that has been stored in an emission capacitor (not shown).

The release button 107 is made up of a first release switch 132 (refer to FIG. 2) that turns on when the button is pressed down halfway, and a second release switch 133 (refer to FIG. 2) that is turned on when the button is pressed down further from the half-pressed state to be pressed down fully. The camera control circuit 101 executes shooting preparation sequences, such as AE (auto exposure) operation and AF (autofocus) operation if the first release switch 132 is turned on. Also, if the second release switch 133 is turned on shooting is carried out by executing a series of shooting sequences to control the focal plane shutter 104 etc., acquire image data based on a subject image from the image sensor 103 etc., and store this image data in a storage medium.

The battery 108 supplies power to respective members and respective circuits within the camera body 100 and the interchangeable lens 200.

The lens control circuit 201 within the interchangeable lens 200 is made up of an ASIC including a lens CPU etc., and its peripheral circuits. In response to a command from the camera control circuit 101, or the user operating the MF ring 204, drive control etc. for the focusing lens 203 and the aperture 205 is carried out. Various lens information, such as focal length, set length and aperture value, is sent in response to a request from the camera control circuit 101. This control is executed in accordance with programs that have been stored in a flash ROM (not shown). Details of this lens control circuit 201 will be described later using FIG. 2.

The focusing lens 203 moves in the optical axis direction based on instruction from the lens control circuit 201, and adjusts the focused state of the interchangeable lens 200. In this embodiment, the lens is described as a fixed focal length lens, but it may also be constituted by a zoom lens for which focal length can be varied. The case of a zoom lens will be described later as modified example 1 of this embodiment.

The MF ring 204 is arranged on the outer periphery of the interchangeable lens 200, being capable of a rotation operation around the optical axis of the interchangeable lens 200 and also capable of a slide operation along the optical axis direction between a first position and a second position. By carrying out a rotation operation at a first position where the MF ring 204 having been slid toward the front of the interchangeable lens 200 (toward the subject), a manual focus operation is possible. Also, by performing a rotation operation at the second position where the MF ring 204 has been slid to the rear of the interchangeable lens 200 (toward the photographer), a range focus operation is possible. The MF ring 204 functions as a ring member arranged to be rotatable with respect to a lens barrel, and also arranged to slide in an optical axis direction. The first position and the second position of the MF ring 204 will be described later using FIG. 3 and FIG. 4.

The aperture 205 houses its opening area changed based on instruction from the lens control circuit 201, and adjusts light amount of subject light flux that has passed through the interchangeable lens 200.

Figure 2:
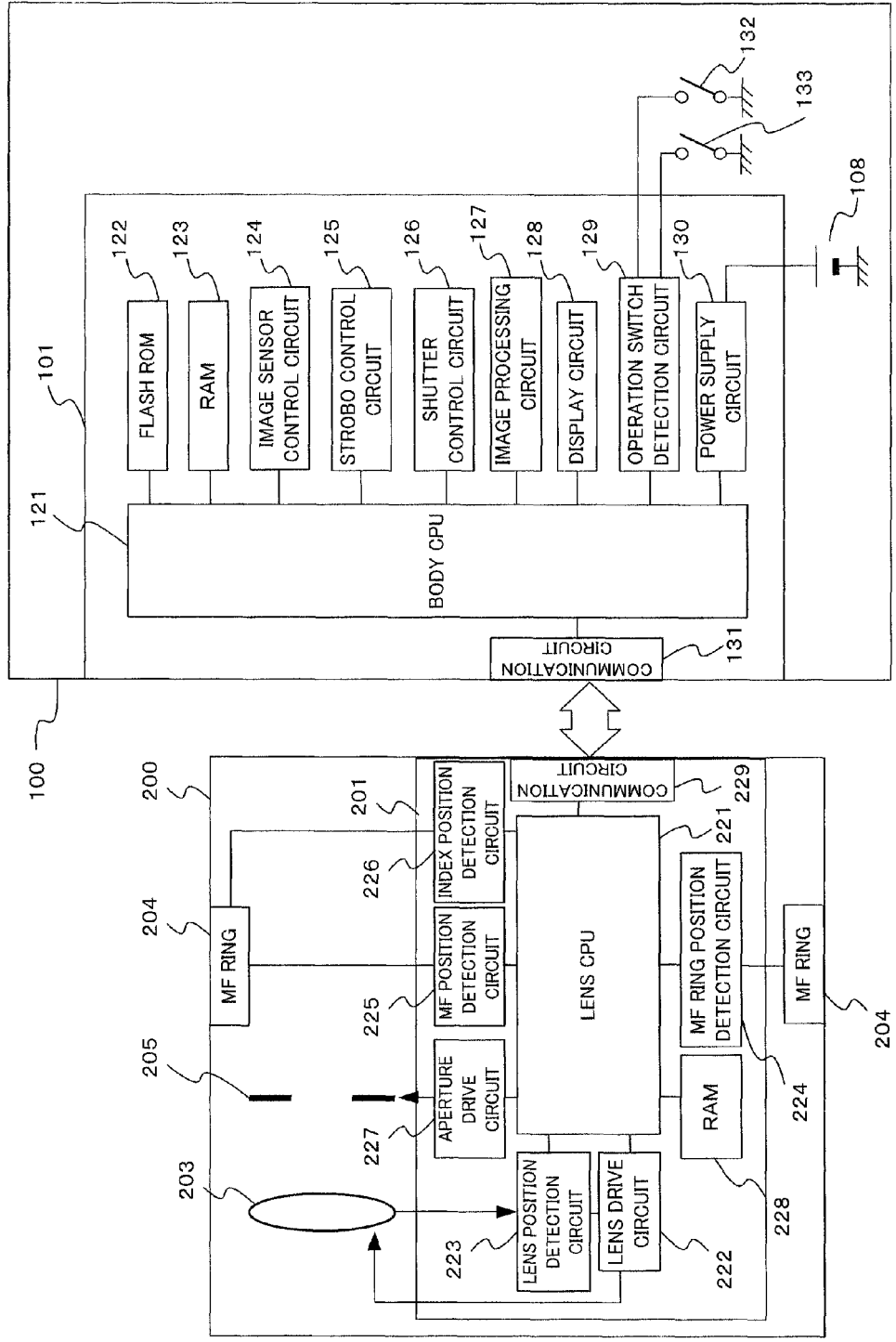
FIG. 2 is a block diagram mainly showing the electrical structure of a camera of one embodiment of the present invention.

Next, details of the camera control circuit 101 lens control circuit 201 will be described using FIG. 2. A body CPU 121 is provided within the camera control circuit 101, and a flash ROM (read only memory) 122, RAM (random access memory) 123, image sensor control circuit 124, strobe control circuit 125, shutter control circuit 126, image processing circuit 127, display circuit 128, operation switch detection circuit 129, a power supply circuit 130, and communication circuit 131 are connected to this body CPU 121. Input and output of various signals is carried out between these various circuits and the body CPU 121.

The body CPU 121 collectively controls the entire camera in accordance with programs etc. that are stored in the flash ROM 122. Also, communication is possible with the lens CPU 221 by means of a camera body communication circuit 131 and a lens communication circuit 229, with control instructions being output and lens information such as lens position of the focusing lens 203 being acquired.

This body CPU 121 functions as a control section for switching display operation by performing determination on signals from a PI circuit of an MF position detection circuit 225, that functions as an encoder, or, if it has been determined by an MF ring position detection circuit 224, that functions as a slide position determination section, that there is positional change accompanying a slide operation, prohibits switching of a display operation. The body CPU 121 also functions as a control section for preventing processing for rotation of the ring member being carried out for a specified period in the event that slide movement of the ring member in the optical axis direction has been detected. This function as the control section may also be carried out by the lens CPU 221, which will be described later.

The flash ROM 122 is an electrically rewritable non-volatile memory, and stores programs to be executed by the body CPU 121, as was described previously, and also stores various adjustment values etc. Memory other than flash ROM may also be adopted as long as it is non-volatile memory. The RAM 123 is an electrically rewritable volatile memory, such as DRAM (dynamic random access memory) or SDRAM (synchronous DRAM), and temporarily stores various information for processing in the body CPU 121.

The image sensor control circuit 124 executes imaging operations at the image sensor 103 in order to convert a subject image into image signals, at the time of executing processing operations that require image data, such as live view display, AE, AF, exposure at the time of shooting etc. As imaging operations, charge storage control and image signal readout etc. are carried out for the image sensor 103.

The strobe control circuit 125 is connected to the strobe unit 106, and carries out charging and emission control of the strobe unit 106. The strobe control circuit 125 carries out emission amount control so as to achieve optimum exposure based on lens position information of the focusing lens 203 that has been acquired from the lens CPU 221, for example. The shutter control circuit 126 is connected to the focal plane shutter 104, and carries out opening and closing control of the focal plane shutter 104 based on a shutter speed signal from the body CPU 121.

The image processing circuit 127 applies image processing such as A/D conversion and filter processing on image signals that have been output from the image sensor 103. Also, in applying image processing, image processing for live view display is carried out, and live view display is performed on the display monitor 105 based on the processed image signals. Image processing of a taken image for storage is also carried out, and this processed image data is stored in a storage medium (not shown).

Also, the image processing circuit 127 carries out extraction processing by subjecting high-frequency components from image signals within a focus detection region to high pass filter processing, and calculates an AF evaluation value. As a result the image processing circuit 127 provides a function as a focus detection section for carrying out focus detection. In this embodiment, well-known contrast AF has been adopted in the focus detection, where the focusing lens 203 is moved and a position at which the AF evaluation value becomes a peak is made a focus position. The focus detection method is not limited to contrast AF, and another method such as phase difference AF may also be adopted.

The display circuit 128 is connected to the display monitor 105, and carries out live view display, playback display of taken images that have been stored in a storage medium, and display of various shooting information such as menu screens.

The operation switch detection circuit 129 is connected to the first release switch 132 linked to the release button 107, and to the second release switch 133 and other detection switches (not shown), and detects operating states of the switches, outputting detection results to the body CPU 121. The other detection switches are a power supply switch that is linked to a power supply button for turning a power supply on or off, a shooting mode switch for switching shooting modes of the camera, a menu switch that is linked to a menu button for displaying menu screens, a playback switch that is linked to a playback button for causing execution of playback display of taken images stored in the storage medium, a mount switch for detecting an attachment state of the interchangeable lens 200, and a movie switch that is linked to a movie button for instructing start and stop of movie shooting, etc.

Setting of various shooting information, such as focusing mode, is carried out through the above-described menu screens. In this embodiment there are two focusing modes set in the menu screens, namely autofocus mode (AF mode) where focusing of the focusing lens 203 is carried out automatically, and manual focus mode (MF mode) where focusing is carried out manually. Focusing mode setting of the camera body 100 may also be carried out using a method other than with the menu screens as in this embodiment, such as setting using dedicated buttons. The operation switch detection circuit 129 and body CPU 121 etc. are provided in the camera body, and provide a function as a focusing mode setting section for setting the focusing mode.

The power supply circuit 130 is connected to the battery 108, and performs smoothing and boosting etc. of the power supply voltage to supply power to each of the circuits and each of the members within the camera body 100 and the interchangeable lens 200.

The camera body communication circuit 131 of the camera body has a synchronization signal terminal and a plurality of communication terminals, such as data terminals, provided on a mount section at an outer part of the camera body 100. Communication is carried out between the body CPU 121 and the lens CPU 221 by means of the lens communication circuit 229. Communication between the camera body communication circuit 131 of the camera body and the lens communication circuit 229 is carried out by asynchronous communication when the body and the detachable lens are initially attached, but after acquiring information on the interchangeable lens at the camera body side communication is carried out using synchronous communication provided that the attached interchangeable lens 200 is capable of synchronous communication.

The lens CPU 221 is provided within the lens control circuit 201. A lens drive circuit 222, lens position detection circuit 223, MF ring position detection circuit 224, MF position detection circuit 225, index position detection circuit 226, aperture drive circuit 227, RAM 228, and communication circuit 229 are connected to this lens CPU 221.

The lens CPU 221 carries out control within the interchangeable lens 200 in accordance with programs and various adjustment values that have been stored in a flash ROM (not shown) connected to the lens CPU 221 that is provided within the interchangeable lens, output signals from the lens position detection circuit 223, MF ring position detection circuit 224, MF position detection circuit 225, and index position detection circuit 226, and control instructions from the body CPU 121. Specifically, various drive control is carried out such as lens drive of the focusing lens 203 and aperture drive of the aperture 205. Also, communication with the body CPU 121 is carried out by means of the camera body communication circuit 131 and the lens communication circuit 229, to receive operation instructions from the body CPU 121 and transmit information representing the lens state, such as lens operating state and optical data of the interchangeable lens 200.

The lens drive circuit 222 is configured including an actuator, such as a stepping motor, and a motor driver, and carries out drive control of the focusing lens 203 in the optical axis direction. Also, in the case where focusing is carried out in range focus mode (RF mode), which will be described later, braking (acceleration and deceleration) control of the focusing lens 203 is carried out using synchronization signals for synchronous communication from the camera body 100 as timing signals. Drive control using a so-called wobbling operation where the focusing lens 203 is finely driven back and forth, is also possible.

The lens position detection circuit 223 carries out position detection of the focusing lens 203. This lens position detection circuit 223 is constructed including a photo interrupter (PI) circuit for converting a rotational amount of a drive motor, such as the stepping motor included in the lens drive circuit 222, to a number of pulses. A position detection result from the lens position detection circuit 223 is output as a number of pulses from a reference position such as the infinity end, and this number of pulses represents an absolute position of the focusing lens 203.

The MF ring position detection circuit 224 detects a slide position of the MF ring 204 in the optical axis direction of the interchangeable lens 200. Specifically, the MF ring 204 is capable of sliding to two positions, namely a manual focus operation position (MF position, first position) when it has been slid towards the front of the interchangeable lens 200, and a range focus operation position (RF position, second position) when it has been slid towards the rear of the interchangeable lens 200. The MF ring position detection circuit 224 detects whether the MF ring 204 is at the first position or at the second position. The MF ring position detection circuit 224 fulfills a function as a slide position determination section for determining positional change accompanying slide movement of the MF ring 204 to the first position or the second position, and a function as a slide detection section for detecting slide movement of the MF ring 204, which here functions as a ring member, in the optical axis direction. This position detection mechanism will be described later using FIG. 5.

The MF position detection circuit 225 is constructed including a PI circuit, and detects an amount of relative positional change of the MF ring 204 in the rotational direction about the optical axis center of the interchangeable lens 200. Specifically, when the position of the MF ring 204 that has been detected by the MF ring position detection circuit 224 is the manual focus operation position (MF position, first position), rotation direction, rotation amount, rotational speed, etc. of the MF ring 204 can be detected based on pulse signals output from the PI circuit. A detection timer used in rotation detection of this MF ring 204 is a common built-in timer within the lens CPU 221. The PI circuit of the MF position detection circuit 225 fulfills functions as an encoder for generating signals in response to a rotation operation of the MF ring 204 functioning as a ring member, and a rotation detection section for detecting rotation of the ring member. The structure of the photo interrupter of the PI circuit will be described later using FIG. 5.

The index detection circuit 226 is constructed including a linear encoder and an A/D conversion circuit etc., and carries out detection of range index corresponding to drive target position of the focusing lens 203. Specifically, when position of the MF ring 204 that has been detected by the MF ring position detection circuit 224 is the range focus position (RF position, the second position), detection of range index position corresponding to a drive target position, set at a rotational direction position of the MF ring 204 around the optical axis center of the interchangeable lens 200, is carried out based on a result of A/D conversion of an encoder value. That is, the index detection circuit 226 carries out detection of absolute distance that has been set by the MF ring 204.

A mode for controlling the focusing lens 203 so as to be equivalent to a distance (preset distance) determined by the absolute position of the MF ring 204 in the rotational direction, when there has been a slide operation of the MF ring 204 to the RF position (second position), is referred to as range focus mode (RF mode). As a timing signal for a detection timer used when reading this encoder value use is made of a lens communication synchronization signal for carrying out synchronous communication between the camera body 100 and the interchangeable lens 200. The structure of one example of a detection mechanism of the index detection circuit 226 that uses a linear encoder will described later using FIG. 6.

The aperture drive circuit 227 is configured including an actuator, such as a stepping motor, and a motor driver, and carries out opening operation control of the aperture 205 in accordance with an aperture value from the lens CPU 221.

The RAM 228 is a volatile memory for temporarily storing various information used by the lens CPU 221.

The lens communication circuit 229 has a synchronization signal terminal, and a plurality of communication terminals, such as data terminals, provided on a mount section at an outer part of the interchangeable lens 200, and engages with communication connection terminals of the camera body communication circuit 131 to carryout communication with the camera body. Control commands for the focusing lens 203 and the aperture 205 from the body CPU 221 are received via this lens communication circuit 229, and lens state information such as optical data, lens position information, and operating state are transmitted to the body CPU 221.

Figure 3:
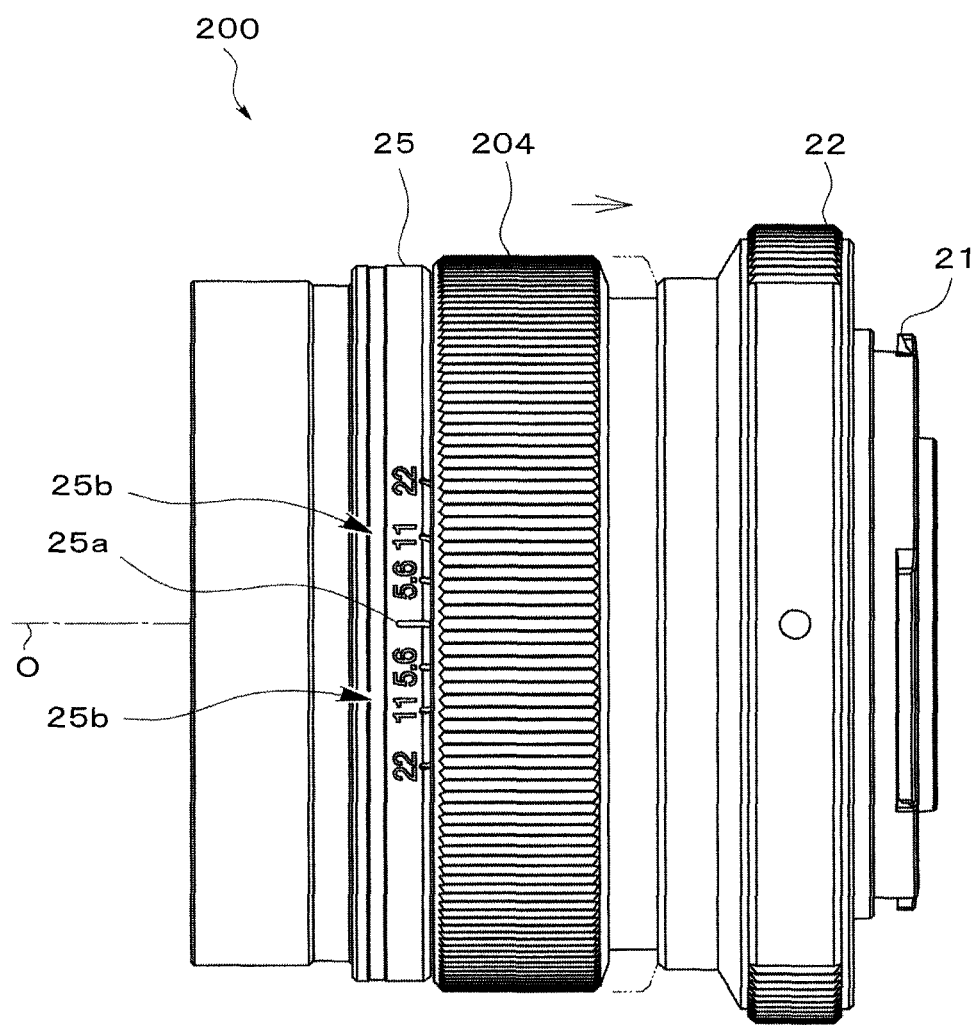
FIG. 3 is a plan view of a lens barrel of a camera of one embodiment of the present invention, in a state where an MF ring is positioned at a first position.
Figure 4:
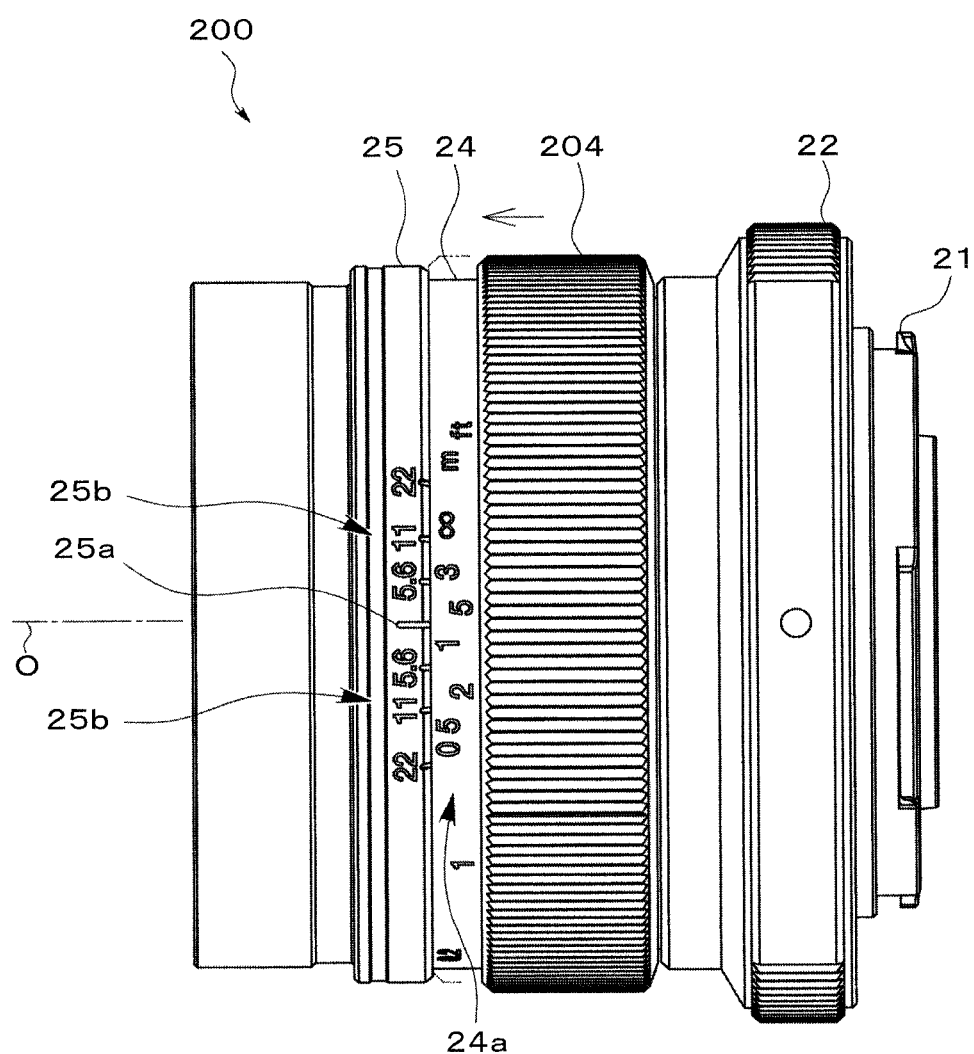
FIG. 4 is a plan view of a lens barrel of a camera of one embodiment of the present invention, in a state where an MF ring is positioned at a second position.

Next, slide operation of the MF ring 204 to the first position and the second position will be described later using FIG. 3 and FIG. 4. FIG. 3 shows the case where the MF ring 204 is at the first position, and FIG. 4 shows the case where the MF ring 204 is at the second position.

A bayonet section 21 is provided on the rear of the interchangeable lens 200. This bayonet section 21 is capable of attaching the interchangeable lens 200 to the camera body 100 by engaging with a bayonet section on the camera body 100. A base 22 is integrally formed with the bayonet section 21, and if the bayonet section 21 is attached to the camera body 100 it is fixed to the camera body 100.

The MF ring 204 has a substantially cylindrical shape arranged capable of rotation about an optical axis O, and capable of reciprocal movement in the optical axis O direction, at an outer peripheral section of a lens barrel of the interchangeable lens 200. The MF ring 204 is exposed on the outer periphery of the lens barrel, and is arranged so as to be held by a photographer's fingers. It is also possible to have a structure where only a part of the MF ring 204 is exposed on the outer periphery. There is also a slide mechanism for slide movement of the MF ring 204, functioning as a ring member, to a first position or a second position in the optical axis direction.

An index display frame 25 is part of an outer member of the lens barrel, and has its position fixed with respect to the base section 22. The index display frame 25 is arranged further to the front than the MF ring 204, even if the MF ring 204 is at the first position (MF position). An index 25a and a subject depth index 25b are displayed in this index display frame 25. The index 25a shows a reference index of a distance scale 24a provided on a distance display ring 24, which will be described later, while the subject depth index 25b shows subject depth corresponding to aperture value of the aperture 205 with respect to the distance scale 24a.

In the state shown in FIG. 3, if the MF ring 204 is subjected to a slide movement along the optical axis O to the rearward second position (imaging side, camera body side), then the distance display ring 24 is exposed, as shown in FIG. 4. The distance display ring 24 is a substantially cylindrical member arranged at an inner side of the MF ring 204, and when the MF ring 204 is at the first position does not move integrally with the MF ring 204. However, if the MF ring 204 is moved to the second position, the distance display ring 24 is capable of rotating integrally with the MF ring 204 about the optical axis O.

As shown in FIG. 4, the distance scale 24a showing the distance at which the focusing lens 203 is focused (in-focus distance) is shown on the outer peripheral surface of the distance display ring 24. The distance scale 24a has numerical values arrayed along a circumferential direction, representing distance from the minimum in-focus distance to infinity. By rotating the distance display ring 24 around the optical axis O with respect to the index display frame 25, the numerical value of the distance scale 24a pointed to by the index 25a is changed.

The distance display ring 24 is has a restricted range of rotation about the optical axis O, and is only capable of rotating within the distance range indicated by the index 25a. Accordingly, the distance scale 24a displays numerical values of distance from the minimum in-focus distance to infinity, with respect to the index 25a.

In this manner, with this embodiment, when the MF ring 204 is positioned at the first position (MF position), as shown in FIG. 3, the distance scale 24a of the distance display ring 24 is in a state where it can not be seen from the outside of the lens barrel. On the other hand, when the MF ring 204 is positioned at the second position (RF position), as shown in FIG. 4, the distance scale 24a is in a state where it can be seen from the outside of the lens barrel.

The distance display ring 24 is constructed so as to rotate about the optical axis O together with the MF ring 204 only when the MF ring 204 is at the second position, as was described previously, and when the MF ring 204 is at the first position (MF position) the MF ring 204 is capable of rotation independently of the distance display ring 24.

Figure 5:
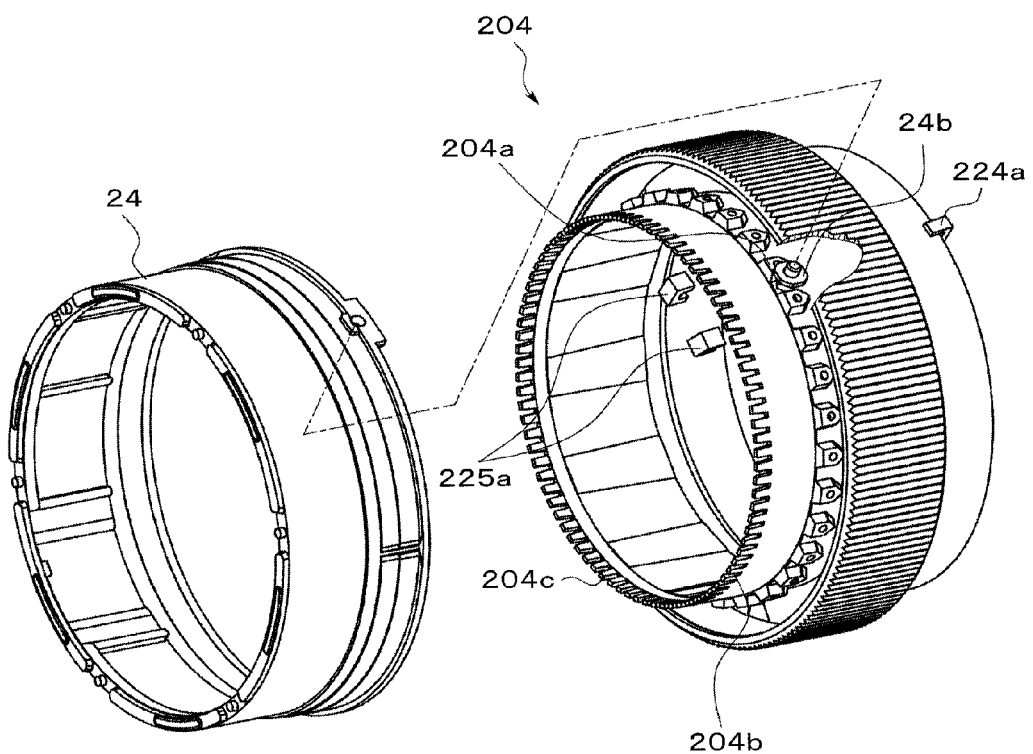
FIG. 5 is a perspective view for describing engagement of an MF ring and a distance display ring, with the camera of one embodiment of the present invention.

Specifically, as shown in FIG. 5, an engagement pin 24b projects radially inward at an inner part of the distance display ring 24. Also, a plurality of engagement sections 204a are arranged on an inner cylindrical section 204b of the MF ring 204. When the MF ring 204 is at the first position (MF position), the engagement pin 24b is further to the rear than the engagement sections 204a of the MF ring 204, and even if the MF ring 204 is rotated around the optical axis O it is at a position that does not interfere with the engagement sections 204a. Also, when the MF ring 204 is at the second position (RF position), the engagement pin 24b is arranged at a position that overlaps the engagement sections 204a. Accordingly, when the MF ring 204 is at the second position the distance display ring 24 rotates about the optical axis O together with the MF ring 204, while when the MF ring 204 is at the first position, the distance display ring 24 remains stationary without rotating even if the MF ring 204 is rotated about the optical axis O.

Next, the structure of the detection mechanism for the MF ring position detection circuit 224 and the MF position detection circuit 225 will be described using FIG. 5. The MF ring position detection circuit 224 has a photo interrupter section 224a. This photo interrupter section 224a is fixed to the base section 22 or to a member integrally constituting the base section 22, and when the MF ring 204 is positioned at the second position the photo interrupter section 224a is at a position where at least a part of the MF ring 204 enters into a detection range, and when the MF ring 204 is positioned at the first position the photo interrupter section 224a is provided at a position outside the detection range.

With this embodiment, position of the MF ring 204 is detected by the photo interrupter section 224a, but it means detection is not limited to a photo interrupter, and another detection sensor may be adopted as long as it is capable of detecting the position of the MF ring 204. For example, it is possible to use a magnetic sensor or switch etc.

The MF position detection circuit 225 has a pair of photo interrupters 225a. Also, a plurality of slits holes 204c provided a specified distance apart are provided in a circumferential direction of an inner cylinder 204b that rotates integrally with the MF ring 204. The pair of photo interrupters 225a are provided within a detection range of the slit holes 204c when the MF ring 204 is at the first position (MF position). Rotational conditions such as the rotation direction, rotation amount, and rotation speed of the MF ring 204 about the optical axis O are then detected based on output signals from the pair of photo interrupters 225a.

The detection sensor of the MF position detection circuit 225 can also be a magnetic rotary encoder or the like, for example, as long as it is capable of detecting rotation of the MF ring 204 when the MF ring 204 is at the first position (MF position).

Figure 6:
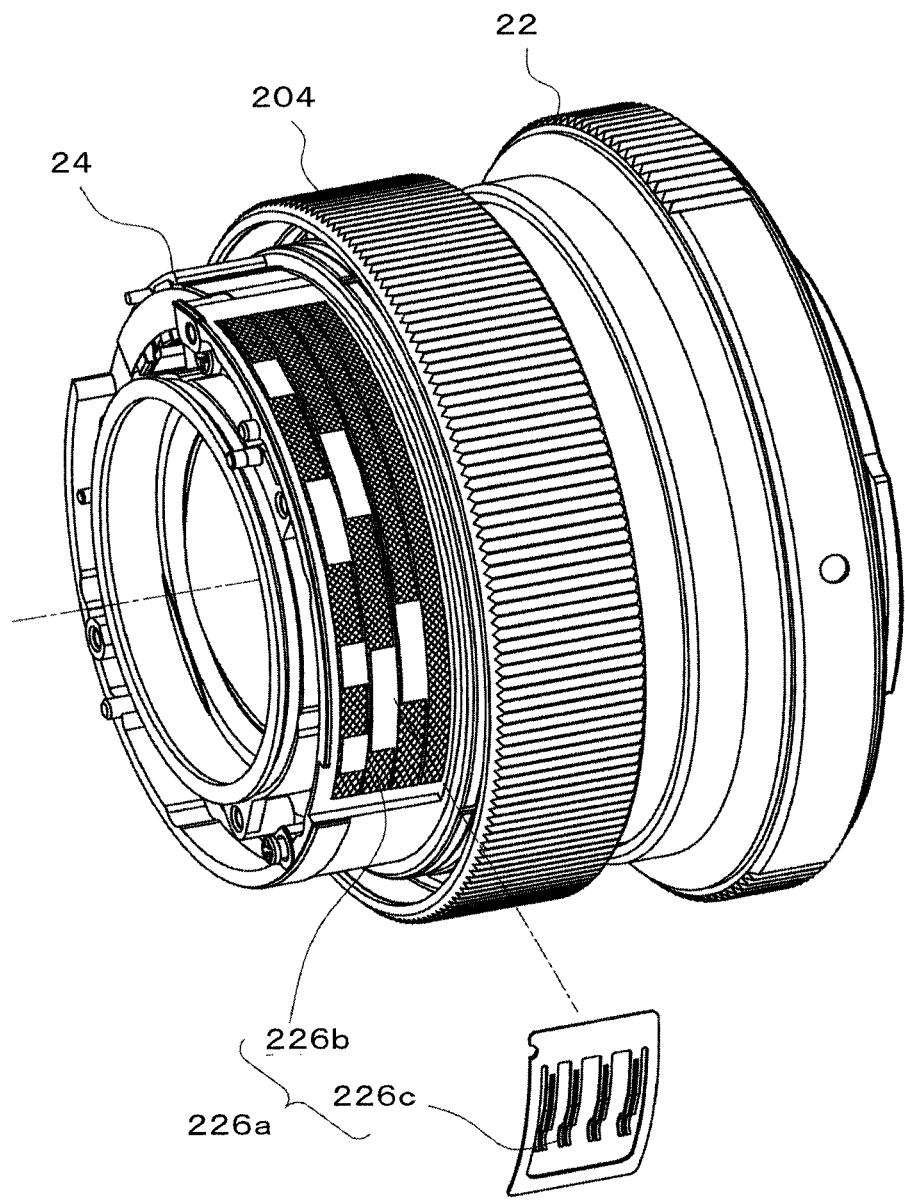
FIG. 6 is a perspective view showing the structure of an index position detection section of a camera of one embodiment of the present invention.

Next, the detecting mechanism of the index position detection circuit 226 will be described using FIG. 6. The index position detection circuit 226 has an encoder section 226a. This encoder section 226a detects absolute rotation position (preset position) about the optical axis O, with respect to the base section 22 of the distance display ring 24. The encoder section 226a comprises a plurality of code patterns 226b of a specified number of bits formed from conductive bodies, and a contact point section 226c formed from conductive bodies that slide on the code patterns 226b.

The code patterns 226b are arranged on the outer peripheral part of the distance display ring 24, while the contact point section 226c is arranged on a fixed frame formed integrally with the base section 22. If the distance display ring 24 is rotated about the optical axis O, the positions of the code patterns 226b connecting to the contact point section 226c vary in accordance with the rotation position. The index position detection circuit 226 detects changes in connection state between the code patterns 226b and the contact point section 226c, and detects absolute rotational position of the MF ring 204 about the optical axis O.

The index position detection circuit 226 may also adopt a structure other than a contact point type encoder, as long as it is capable of detecting absolute rotational position about the optical axis O, with respect to the base section 22. For example, it is also possible to have an optical or magnetic rotary encoder for absolute position detection, and it is also possible to have a potentiometer whose resistance varies in accordance with rotational position of the distance display ring 24 about the optical axis O. Also, in this embodiment, in the detection of absolute position, lens communication synchronization signals at the time of synchronous communication between the camera body 100 and the interchangeable lens 200 are used as detection timing signals in order to carry out detection at high-speed.

Figure 7:
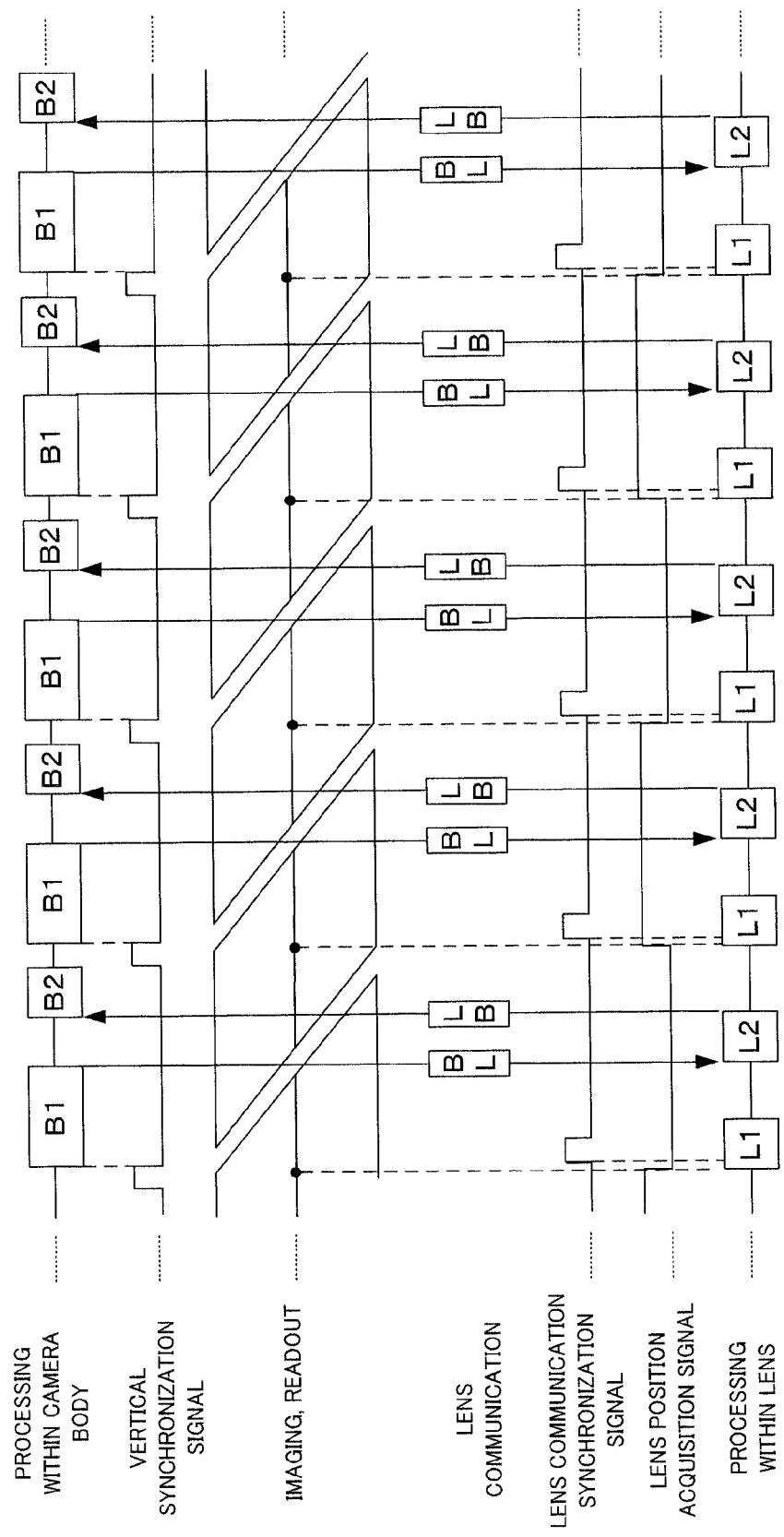
FIG. 7 is a timing chart showing one example of synchronous communication between an interchangeable lens and the camera body, in a camera of one embodiment of the present invention.

Next, one example of synchronous communication that is performed between the camera body 100 and the interchangeable lens 200 will be described using FIG. 7. In FIG. 7, the horizontal axis represents the flow of time, while the vertical axis represents respective processing content and timing. In processing within the camera body, in process B1 display of a live view image, and calculation of an AF evaluation value, are carried out using image data that was acquired in the previous frame. Also, in process B2 AF calculations and various setting changes etc. are carried out based on lens state data that was acquired from lens state communication.

A vertical synchronization signal is a signal that is output in correspondence with each frame. With imaging and readout, a subject image is formed on the image sensor 103, and image data of this formed image is read out. The imaging and readout have a rhombus shape in FIG. 7, which is because in this embodiment, at the time of acquiring a live view image a rolling shutter is adopted, and imaging and readout are carried out sequentially every pixel line.

With the communication BL of the lens communication, a lens state data request command is transmitted from the camera body 100 to the interchangeable lens 200, and this command requests transmission of data representing the lens state of the interchangeable lens 200 to the camera body 100. Also in the communication LB, the interchangeable lens 200 transmits data representing the lens state of the interchangeable lens 200 to the camera body 100 in response to the lens state data request command.

A lens communication synchronization signal is generated in response to a vertical synchronization signal in the camera body 100, and this lens communication synchronization signals is output to the interchangeable lens 200 from a synchronization signal terminal of the camera body communication circuit 131. A lens position acquisition signal changes state at a predetermined time, for example, with the example shown in FIG. 7, at a time point after a time point substantially at the central point time of a charge accumulation time of the image sensor 103.

Also, processing L1 within the interchangeable lens 200 is processing to acquire position information of the focusing lens 203 at a time where the lens position acquisition signal changes state, and detect operating state of the MF ring 204 at a time when the lens communication synchronization signal is received. Also, processing L2 is processing to transmit position information of the focusing lens 203 and lens state data such as operating state of the MF ring 204, in response to a lens state data request command that has been received from the camera body 100.

As shown in the timing chart of FIG. 7, with the synchronous communication of this embodiment, processing B1 within the camera body 100 is executed in synchronization with the vertical synchronization signal, and a lens communication synchronization signal is transmitted to the interchangeable lens 200 in synchronization with the vertical synchronization signal.

Once processing B1 within the camera body 100 has been processed, a lens state data request command is transmitted to the interchangeable lens 200 by communication BL. Once the interchangeable lens 200 has received the lens state data request command, the lens state is detected and lens state data is transmitted by communication LB. The camera body 100 receives the lens state data and then executes processing B2.

Also, within the interchangeable lens 200, processing L1 for acquiring lens position is executed in synchronization with a lens position acquisition signal. This lens position acquisition signal is generated at a predetermined time, and with the example shown in FIG. 7, as was described previously, at a time point after half of a charge accumulation time has elapsed at the screen center of the image sensor 103. The interchangeable lens 200 acquires position information of the focusing lens 203 using the lens position detection circuit 223, at the time when the lens position acquisition signal changes state. These synchronous communications are all executed in synchronization with the lens communication synchronization signal.

Next the focusing modes of this embodiment will be described. In this embodiment, three focusing modes have been implemented, namely auto focus mode (AF mode), manual focus mode (MF mode) and range focus mode (RF mode). AF mode is carrying out automatic focusing of the focusing lens 203 using a climbing method that uses contrast AF, based on image data from the image sensor 103. MF mode is carrying out focusing, when the MF ring 204 is at the first position (MF position), by manually rotating the MF ring 204 and moving the focusing lens 203 in accordance with the rotation state at this time. AF mode and MF mode are set in the camera body 100 on menu screens, for example, as was described previously.

Figure 8A:
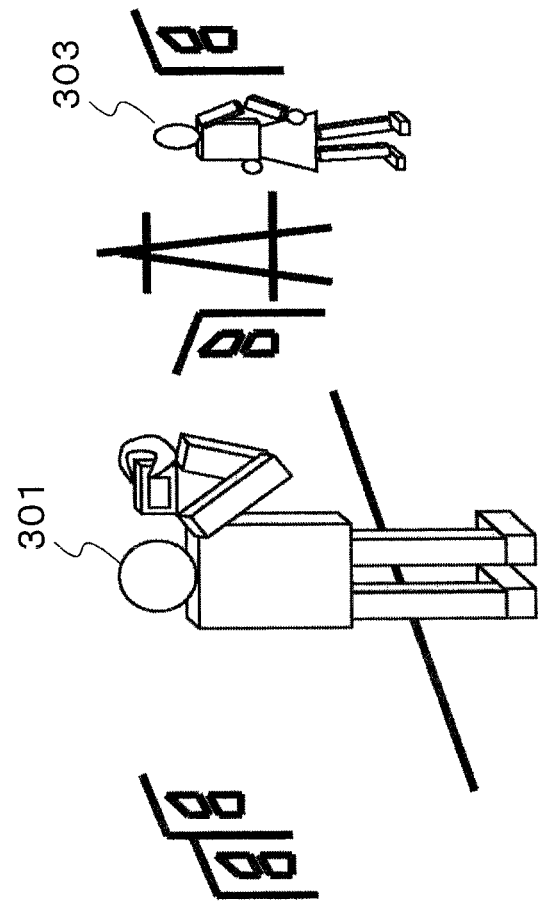
FIG. 8A and FIG. 8B are drawings showing the appearance of taking photographs when set to range focus mode, with the camera of one embodiment of the present invention.
Figure 8B:
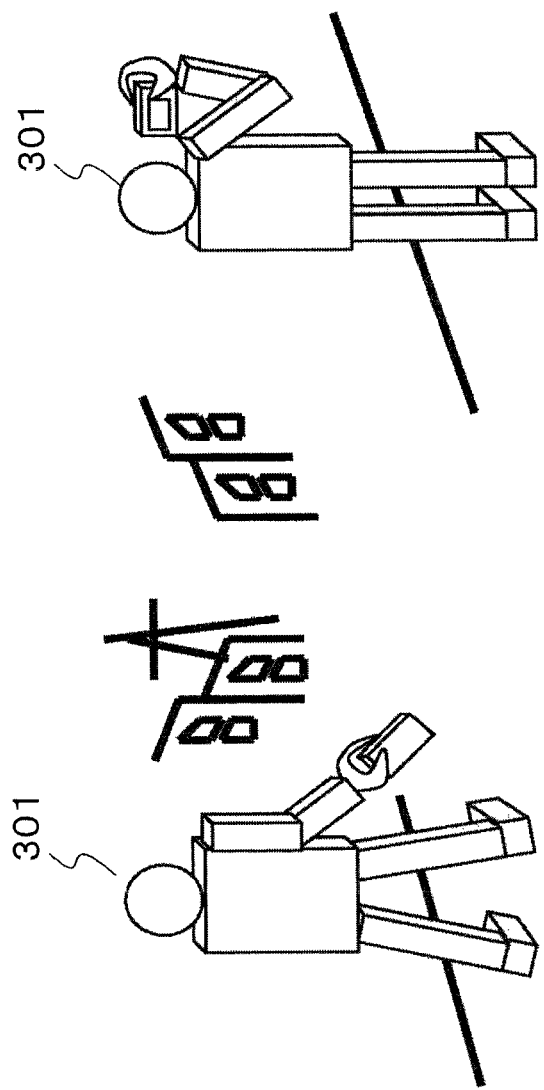

Differing from AF mode and MF mode, RF mode involves carrying out distance setting by rotating the MF ring 204, when the MF ring 204 is at the second position, and aligning the distance scale 24a of the distance display ring 24 with the index 25a, and then carrying out focusing to this set distance. After the distance has been set beforehand in RF mode, if the power supply is turned off and then after that the power supply is turned on in RF mode, it is possible to focus to the distance that was set beforehand. For example, as shown in FIG. 8A, when the photographer 301 is strolling through a town etc., if a distance has been set before hand in RF mode, then as shown in FIG. 8B it is possible to rapidly take a shot even if a subject 303 suddenly comes into view.

Also, after distance setting in RF mode, even if MF mode or AF mode are switched to by sliding the MF ring 204 to the first position (MF position), if the MF ring 204 is slid to the second position focusing is immediately carried out to the set distance.

Figure 9:
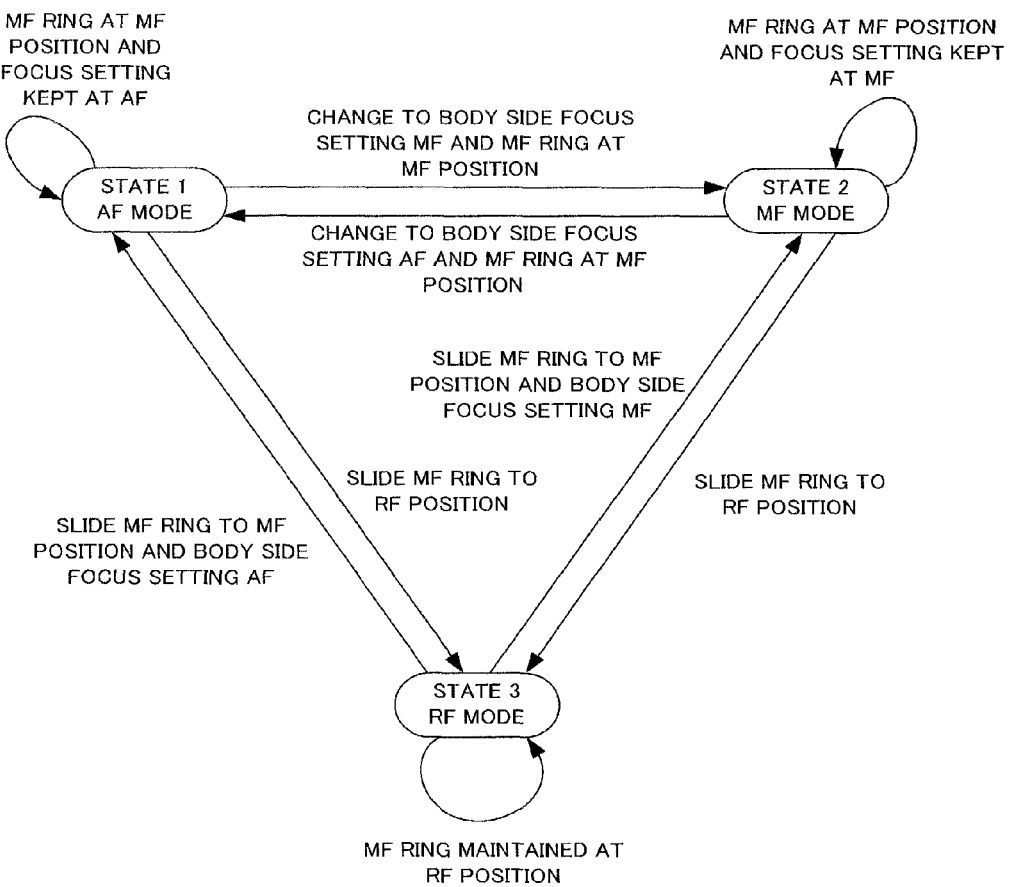
FIG. 9 is a state transition diagram for autofocus (AF) mode, manual focus (MF) mode, and range focus (RAF) mode, in a camera of one embodiment of the present invention.

Therefore, with this embodiment, there are 3 modes, namely AF mode, MF mode, and RF mode, for focusing. Switching of these 3 modes will be described using FIG. 9. In FIG. 9, state 1 is AF mode, state 2 is MF mode, and state 3 is RF mode. Of these states, AF mode and MF mode are set on menu screens of the camera body 100, as was described previously, and RF mode can be set by performing a sliding movement of the MF ring 204 of the interchangeable lens 200 to the second position.

The AF mode of state 1 remains in AF mode if the MF ring 204 is at the MF position (first position) and AF mode is still set as the focusing setting on the menu screen of the camera body 100. The MF mode of state 2 remains in MF mode if the MF ring 204 is at the MF position (first position) and MF mode is still set in the camera body 100.

In switching from AF mode of state 1 to MF mode of state 2, the focusing setting should be changed to MF mode at the camera body 100 with the MF ring 204 kept at the MF position (first position). Conversely, in switching from MF mode to AF mode, the focusing setting should be changed to AF mode with the MF ring 204 kept at the MF position (first position).

In switching from the AF mode of state 1 to the RF mode of state 3, all that is required is a slide operation of the MF ring 204 to the RF position (second position), and it is not necessary to change the focusing setting at the camera body 100. Conversely, in switching from the RF mode of state 3 to the AF mode of state 1, a slide operation of the MF ring 204 to the MF position (first position) is carried out, together with changing of the focusing setting in the camera body 100 to AF mode.

In switching from the MF mode of state 2 to the RF mode of state 3, all that is required is a slide operation of the MF ring 204 to the RF position (second position), and it is not necessary to change the focusing setting in the camera body 100. Conversely, in switching from the RF mode of state 3 to the MF mode of state 2, a slide operation of the MF ring 204 to the MF position (first position) is carried out, together with changing of the focusing setting in the camera body 100 to MF mode.

In this manner, with this embodiment, there are three focusing modes of AF mode, MF mode, and RF mode, and among these three modes AF mode and MF mode must be set at the camera body 100, while having the MF ring 204 that is provided on the interchangeable lens 200 set to the first position. On the other hand RF mode is capable of being set by simply setting the MF ring 204 provided on the interchangeable lens 200 to the second position, regardless of the focusing mode setting in the camera body 100. Conventionally, with a camera fitted with an interchangeable lens, it was general practice to have a relationship where the camera was the master device and the interchangeable lens was the slave. With this embodiment however, if RF mode is set on the interchangeable lens, the interchangeable lens becomes the master device with respect to focusing. As a result it is possible to carry out focusing in RF mode rapidly. Specifically, it is possible to automatically switch the focusing mode by operating the ring member (MF ring) provided on the interchangeable lens.

Also, with this embodiment, the MF ring 204 as the ring member is capable of two operations, namely a rotation operation and a slide operation. Manual focusing when in MF mode and distance setting when in RF mode are therefore possible with the rotation operation, and RF mode setting is possible using a slide operation. This means that the photographer can rapidly carry out switching of focusing modes and distance setting by simply operating the MF ring 204 while concentrating on the viewfinder etc.

Also, in this embodiment, at the first position the MF ring 204, as the ring member, becomes a manual focusing member at the time of MF mode. or at the second position becomes a distance setting member at the time of RF mode. It is therefore possible to have a single ring member act as an adjustment member having two functions, and it is possible to reduce the size.

Next, operation of this embodiment will be described using the flowcharts shown in FIG. 10 and FIG. 11. The content of this flowchart is mainly executed by the body CPU 121 in accordance with programs stored in the flash ROM 122 within the camera body 100, but some content, when RF mode has been set during the flow for MF ring operation detection and operation processing, is mainly executed by the lens CPU 221 in accordance with programs stored in the flash ROM within the interchangeable lens 200.

Figure 10:
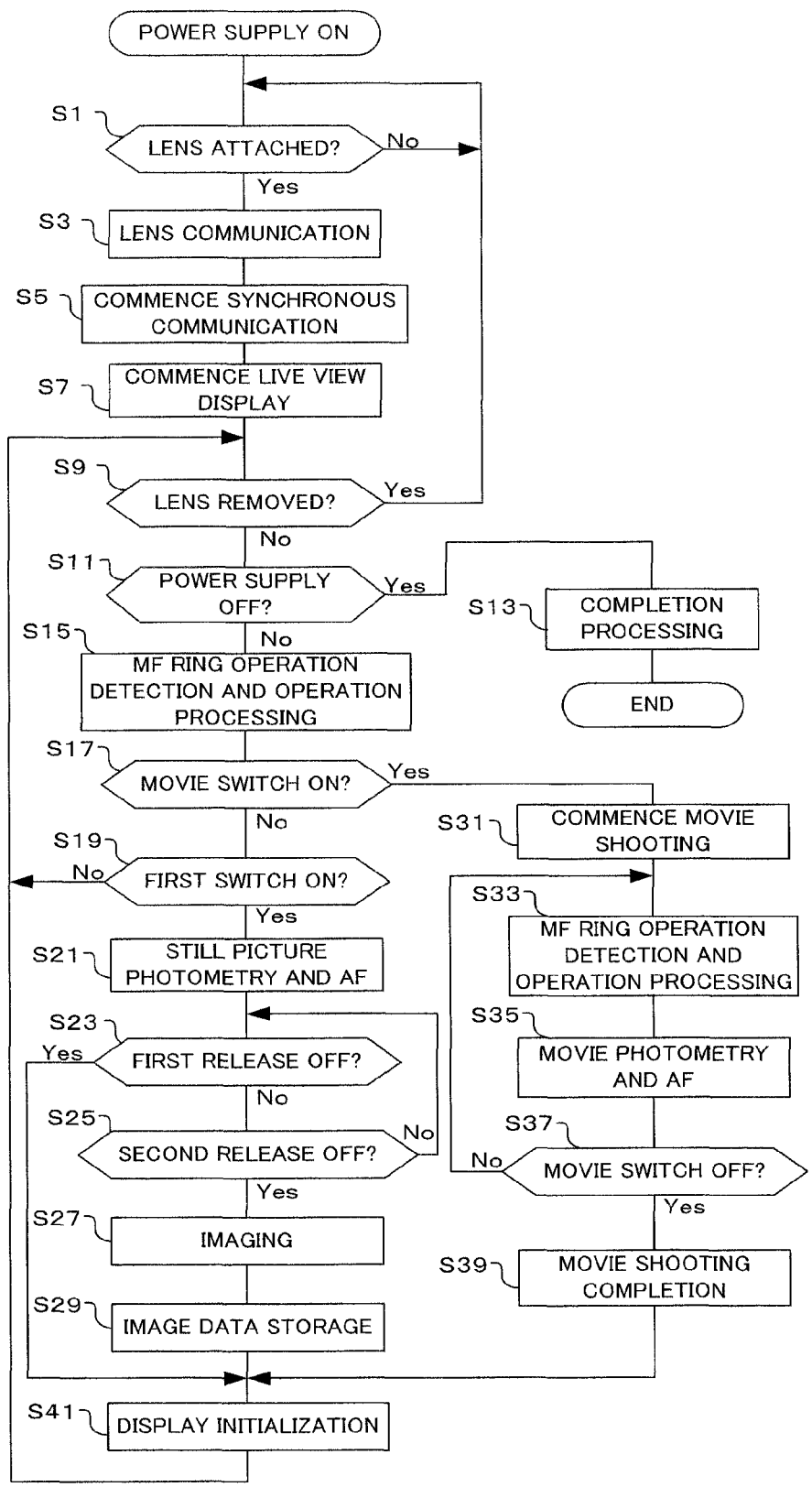
FIG. 10 is a flowchart showing shooting operation of the camera of one embodiment of the present invention.

If the operation switch detection circuit 129 detects that the power supply button has been operated, operations shown in the flowchart of FIG. 10 are commenced. First it is determined whether or not the interchangeable lens 200 is attached. The operation switch detection circuit 129 detects the state of a mount switch or the like, and this determination is carried out based on the result of this detection. If the result of this determination is that the interchangeable lens 200 is not attached, a standby state is entered waiting for attachment of the interchangeable lens 200. In the event that a shooting parameter change operation or playback operation for previously taken images, or setting of focusing mode, are carried out by the photographer during standby, the designated operation is executed.

If the result of determination in step S1 is that the interchangeable lens 200 has been attached to the camera body 100, lens communication is next carried out (S3). Here, asynchronous communication is carried out with the lens CPU 221 by means of the camera body communication circuit 131 and the lens communication circuit 229. Using this asynchronous communication, operating parameters of the focusing lens 203 etc., lens data such as optical data like chromatic aberration data, and information as to whether or not synchronous communication is possible etc. are stored in the RAM 123.

Also, in the lens communication of step S3, information relating to the state of the interchangeable lens 200, such as, for example, position of the MF ring 204 in the optical axis direction (first position or second position), and position in the rotational direction etc. are acquired, and stored in the RAM 123. Also, the value of a counter within the body CPU 121 is set to a larger value than a threshold value. This counter is used in steps S55, S65, and S71 (refer to FIG. 11), which will be described later. However, in the case where processing flow for MF ring operation detection and operation processing, which will be described later, is mainly executed by the lens CPU 221, a counter that is built-in to the lens CPU 221 is used as this counter.

Once the lens communication has been carried out, synchronous communication commences (S5). Here, as was described using FIG. 7, a lens communication synchronization signal is transmitted from the camera body 100 to the interchangeable lens 200, and communication is carried out in synchronization with this signal. For every synchronization period, operating state of the focusing lens 203 etc. and lens state data such as the operating state of the MF ring 204 are acquired, and control operations corresponding to the lens state are executed. Every time the lens communication synchronization signal is output, the camera body acquires data relating to the lens position of the focusing lens 203, whether the MF ring 204 is at the first position or the second position, and information such as aperture value of the aperture 205, and executes control operations corresponding to this information. It is possible to transmit drive direction and drive amount of the focusing lens 203 in order to carry out AF control, and control commands relating to opening amount of the aperture 205, from the camera body 100 also. As a result of the lens communication that was carried out in step S3, synchronous communication is not carried out in the case where an interchangeable lens that is incapable of synchronous communication has been attached.

If synchronous communication has commenced, live view display is next commenced (S7). The body CPU 121 acquires image data by causing the image sensor 103 to be driven every synchronization period by the image sensor control circuit 124, and applies image processing for live view display in the image processing circuit 127. The display circuit 128 commences live view display on the display monitor 105 using image data that has been subjected to processing for live view display.

Once live view display has commenced, it is next determined whether or not the interchangeable lens 200 has been removed (S9). Here, determination of whether or not the interchangeable lens 200 has been removed is carried out based on at least one of communication state of the synchronous communication that was commenced in step S5, and, similarly to step S1, the state of a mount switch. If the result of this determination is that the interchangeable lens 200 has been removed, processing returns to Step S1.

If the result of determination in step S9 is that the interchangeable lens 200 has not been removed, and is attached, it is next determined whether or not the power supply is off (S11). Here, the operation switch detection circuit 129 detects the operating state of the power supply button, and the determination is carried out based on the result of this detection. If the result of this determination is that the power supply is off, termination processing is carried out (S13). Here, processing such as save processing for various data, a reset operation and power supply system disconnect processing etc. is carried out. Once termination processing has been carried out, this processing flow is ended.

If the result of determination in step S11 is that the power supply is not off, MF ring operation detection and operation processing is carried out (S15). Here, operation control and setting processing for the focusing lens 203 is carried out according to the operating state of the MF ring 204. Specifically, in the case where the MF ring 204 is at the second position having been slid to the rear (imaging side) of the interchangeable lens 200, RF mode is executed regardless of whether AF mode has been set or MF mode has been set at the camera body 100. On the other hand, if the MF ring 204 is at the first position having been slid towards the front (subject side) of the interchangeable lens 200, control is carried out in accordance with AF mode or MF mode that has been set at the camera body 100. Also, when a slide operation of the MF ring 204 is carried out, processing for rotation is not carried out for a predetermined period, even if the MF ring 204 is rotated. Details of the MF ring operation detection and operation processing will be described later using FIG. 11.

Once MF ring operation detection and operation processing has been carried out, it is next determined whether or not a movie switch is on (S17). Here, the operation switch detection circuit 129 detects the operating state of the movie switch, and the determination is carried out based on the result of this detection.

If the result of determination in step S17 is that the movie switch is off, namely that the camera is in still picture shooting mode, it is then determined whether or not the first release switch is on (S19). The photographer presses the release button down halfway as a preparation step before shooting. Here the operation switch detection circuit 129 detects the operating state of the first release switch, and determination is carried out based on the result of this detection. If the result of this determination is that the first release switch is off, processing returns to step S9.

If the result of determination in step S19 is that there the first release switch is on, still picture photometry and AF are carried out (S21). Here, operations required for shooting, such as photometry for still picture shooting, exposure calculation, AF etc. are executed. Photometry and exposure calculation involves detecting subject brightness based on image data from the image sensor 103, and calculating exposure control values such as shutter speed and aperture value etc. for correct exposure based on this detected subject brightness. Also, in AF for still picture shooting, an AF operation using a so-called climbing method is carried out so that a high-frequency component (AF evaluation value) that has been extracted from image data becomes a maximum. It is also possible to carryout an automatic focusing operation using phase difference AF.

Once photometry and AF have been carried out, it is next determined whether or not the first release switch is off (S23). There will be cases where, after the photographer has pressed the release button down halfway, as shooting preparation, the finger is taken off the release button and the shooting preparation operation is stopped. Here the operation switch detection circuit 129 detects the operating state of the first release switch, and determination is carried out based on the result of this detection. If the result of this determination is that the first release switch is off, processing advances to step S41, which will be described later.

On the other hand, if the result of determination in step S23 is that the first release switch is not off, namely that it is on, it is next determined whether or not the second release switch is on (S25). If the photographer monitors the live view display and has determined composition and shutter timing, the release button is pressed down fully and execution of shooting is instructed. Here the operation switch detection circuit 129 detects the operating state of the second release switch, and determination is carried out based on the result of this detection. If the result of this detection is that the second release switch is off, step S23 is returned to.

If the result of determination in step S25 is that the second release switch is on, there is a transition to a shooting operation. First, exposure is carried out (S27). Here, the body CPU 121 performs communication with the lens CPU 221 based on the result of the exposure calculation that was calculated in step S21, instructs a stopping down operation of the aperture 205, and after the stopping down operation is completed controls the image sensor 103 and the focal plane shutter 104 using the image sensor control circuit 124 and the shutter control circuit 126, to carry out a shooting operation. After completion of the shooting operation, image data is acquired by subjecting image signals that have been read out from the image sensor 103 to processing by the image processing circuit 127.

Once imaging has been carried out, storage of image data is next carried out (S29). Here, the body CPU 121 stores image data that was acquired in step S27 in the RAM 123 or an external storage memory such as CompactFlash (registered trademark). Also, based on the acquired image data, that taken image is displayed on a display monitor by means of a display circuit 127 for a specified period.

If the result of determination in step S17 was that the movie switch was on, movie shooting mode is entered. First, movie shooting is commenced (S31). The body CPU 121 commences movie shooting by causing the image sensor 103 to be driven every synchronization period by the image sensor control circuit 124. Image signals that were output from the image sensor 103 are subject to image processing for a movie by the image processing circuit 127, and storage of this movie image data in the RAM 123 or an external storage medium such as CompactFlash (registered trademark) is commenced.

Once movie shooting has commenced, MF ring operation detection and operation processing are carried out (S33). Here, as in step S15, operation control and setting processing for the focusing lens 203 is carried out according to the operating state of the MF ring 204.

Once MF ring operation detection and operation processing has been carried out, next movie photometry and AF are carried out (S35). As AE for movie shooting, control is carried out to drive the aperture 205 using the aperture drive circuit 227 in a drive step that is finer than at the time of still picture shooting, so that variation in subject light amount incident on the image sensor 103 becomes uniform. Also, in the case of AF mode, AF for movie shooting involves carrying out a climbing AF operation, and execution of a so-called wobbling operation where the focusing lens 203 is driven back-and-forth by microscopic amounts close to an in-focus state, as required.

Once Movie photometry and AF operation have been carried out, it is next determined whether or not the movie switch is off (S37). When the photographers finishes the movie shooting, a finger is taken off the movie button, and so here the operation switch detection circuit 129 detects the operating state of the movie switch, and determination is carried out based on the result of this detection. If the result of determination is that the movie switch is on, step S33 is returned to and movie shooting continues.

If the result of determination in step S37 is that the movie switch is off, movie shooting completion processing is carried out (S39). Here, the body CPU 121 finishes movie shooting by causing the image sensor 103 to stop operation using the image sensor control circuit 124.

Once storage of image data has been carried out in step S29, or movie shooting completion has been carried out in step S39, or if the result of determination in step S23 is that the first release switch is off, display initialization is next carried out (S41). Here, the body CPU 121 carries out clearing of taken image display or display of movie shooting parameters etc. using the display circuit 127, and returns display on the display monitor 105 to live view display. Once display initialization has been carried out, processing returns to step S9.

Next, MF ring operation detection and operation processing in steps S15 and S33 will be described using the flowchart shown in FIG. 11. Operations in the flow for MF ring detection and operation processing are executed by the lens CPU 221 under the control of the body CPU 121, but when RF mode is executed main execution is by the lens CPU 221.

If the flow for MF ring operation detection and operation processing is entered, first, acquisition of lens state is carried out (S51). Here communication is carried out with the interchangeable lens 200, and the current state of the interchangeable lens 200 is detected. Specifically, lens state, such as whether the MF ring 204 is at the first position (MF position) or second position (RF position), and if the MF ring 204 has been subjected to a rotation operation, are acquired by the MF ring position detection circuit 224 and the MF position detection circuit 225.

If lens state has been acquired, it is next determined whether or not the MF ring 204 has been subjected to slide movement in the optical axis direction (S53). Here, whether or not there has been slide movement is determined by comparing the lens state that was acquired in step S51 and the previous lens state that is stored in the RAM 123.

If the result of determination in step S53 is that the MF ring 204 has been slid in the optical axis direction, counter reset is carried out (S55). This counter is a clock counter within the CPU, and instep S65, which will be described later, it is determined whether or not a count value has exceeded a threshold value.

If counter reset has been carried out, it is next determined whether or not the MF ring 204 is at the MF position (first position) (S57). Here, determination is based on the position of the MF ring 204 that was acquired in step S51.

If the result of determination in step S57 is that the MF ring 204 is at the MF position, setting 1 is carried out (S59). As setting 1, since the MF ring 204 is at the first position (MF position), setting for manual focus mode (MF mode) is carried out. In the case where AF mode is set in the camera body, AF mode is also set in the interchangeable lens 200.

On the other hand, if the result of determination in step S57 is that the MF ring 204 is not at the MF position, setting 2 is carried out (S61). As setting 2, since the MF ring 204 is at the second position (RF position), setting for range focus mode (RF mode) is carried out. If live view display is in progress, enlarged display is terminated.

If the result of determination in step S53 is that the MF ring has not been slid in the optical axis direction, it is next determined whether or not the MF ring 204 is being rotated (S63). Here, whether or not the MF ring 204 is being rotated is determined by comparing the lens state that was acquired in step S51 and the previous lens state that is stored in the RAM 123.

If the result of determination in S63 is that the MF ring is being rotated, it is next determined whether or not the counter has exceeded a threshold value (S65). As was described previously, if the MF ring 204 has been subjected to slide movement in the optical axis direction the counter is reset in step S55, and if the MF ring 204 has been rotated the counter is incremented in step MF ring 204 in step S71 which will be described later. Accordingly, the counter value is sequentially increased while the MF ring 204 is being rotated. As a determination value (threshold), for example, in a case where a this subroutine is processed 20 times in one second, if a threshold value is made 2 a predetermined period becomes about 100 ms. The predetermined period is not limited to 100 ms, as long as it is of sufficient extent to be able to prevent erroneous operation without operability becoming uncomfortable.

If the result of determination in S65 is that the counter has exceeded the threshold value, processing for rotation of the MF ring is next carried out (S67). If setting 1 has been set in step S59, processing is carried out using MF mode. That is, manual focus control is carried out based on rotation direction, rotation amount, and rotational speed etc. of the MF ring 204. In the manual focus control, the focusing lens 203 is moved in accordance with rotation amount of the MF ring 204 so that, for example, focus moves towards the close-up end with clockwise rotation or towards the infinity end with anti-clockwise rotation. Also, in order to assist with this manual focusing, live view is displayed in an enlarged manner, and a timer is set for finishing the enlarged display. In the event that the timer has already been set, it is halted and set again.

In carrying out the processing of step S67, if setting 2 has been set in step S61 processing is carried out using RF mode. That is, the focusing lens 203 is moved so as to focus at a distance determined using absolute position of the MF ring 204 in the rotational direction.

If the result of determination instep S63 is that the MF ring is not been rotated, or if the result of determination in step S65 is that the counter has not exceeded the threshold value, processing for when there is no variation in state of the MF ring is carried out (S69). Here, for example, in the case where MF mode has been set, a clock operation of the timer is carried out, as was described previously. If a fixed time has elapsed from the time of the setting, enlarged display of the live view is stopped in this step.

If processing for MF ring rotation has been carried out in step S67, or if processing for when there is no change in state of the MF ring has been carried out in step S69, the counter is incremented (S71). As described previously, the counter that was reset in step S55 has its count value incremented in this step.

If setting 1 has been carried out in step S59, or if setting 2 has been carried out in step S61, or if the counter has been incremented in step S71, then next the lens state is stored (S73). Information relating to lens state etc. that was acquired in step S51 is stored in the RAM 123. Information relating to lens state that has been stored here is used at the time of the next comparison in steps S53, S63 etc. in this subroutine. Once storage of lens state has been carried out the original processing flow is returned to.

As has been described above, in the flow for MF ring operation detection and operation processing of this embodiment, after movement of the MF ring 204 in the optical axis direction, processing for rotation is not carried out until a specified time has elapsed in step S65, even if the MF ring 204 is rotated. As a result, when the MF ring 204 is subjected to slide movement in the optical axis direction it is possible to prevent erroneous operation in cases where the photographer inadvertently rotates the ring slightly, or the sensor mistakenly detects rotation.

Also, in the case where an assist function is provided to carry out enlarged display of live view in the MF mode, as in this embodiment, even if the MF ring 204 is slid from the RF position to the MF position in order to switch from RF mode to MF mode, operation of the assist function is not commenced until a specified time has elapsed from step S65. As a result, it is possible to prevent enlarged display being carried out suddenly simultaneously with switching from RF mode to MF mode, and the photographer thus losing sight of the image being taken.

With this embodiment, it is determined whether a time measured using a timer has exceeded a specified time in step S65. However as the specified time it is also possible to use a time required for movement corresponding to a rotational angle etc. instead of time literally. In this case, it is preferable to count a PI signal from the MF position detection circuit 225, and determine whether or not there has been rotation for example by 1-2 degrees.

Next, modified example 1 of the one embodiment of the present invention will be described. With this modified example 1, a lens of the interchangeable lens 200 is a zoom lens having a lens group whose focal length can be varied, the MF ring 204 is replaced with a zoom ring, and this zoom ring, similarly to the case of the MF ring, is capable of sliding movement to a first position in the optical axis direction (toward the front of the interchangeable lens, toward the subject) and a second position (toward the rear of the interchangeable lens, towards the imaging surface). When the zoom ring is at the first position, the zoom ring functions as a manual zoom using a rotation operation, while when it is at the second position control for focal length index mode is carried out using a rotation operation. Manual zoom is a mode for relatively changing the focal length in response to a rotation operation by the photographer, and focal length index mode is a mode for setting focal length at an absolute value for focal distance that has been set.

Figure 11:
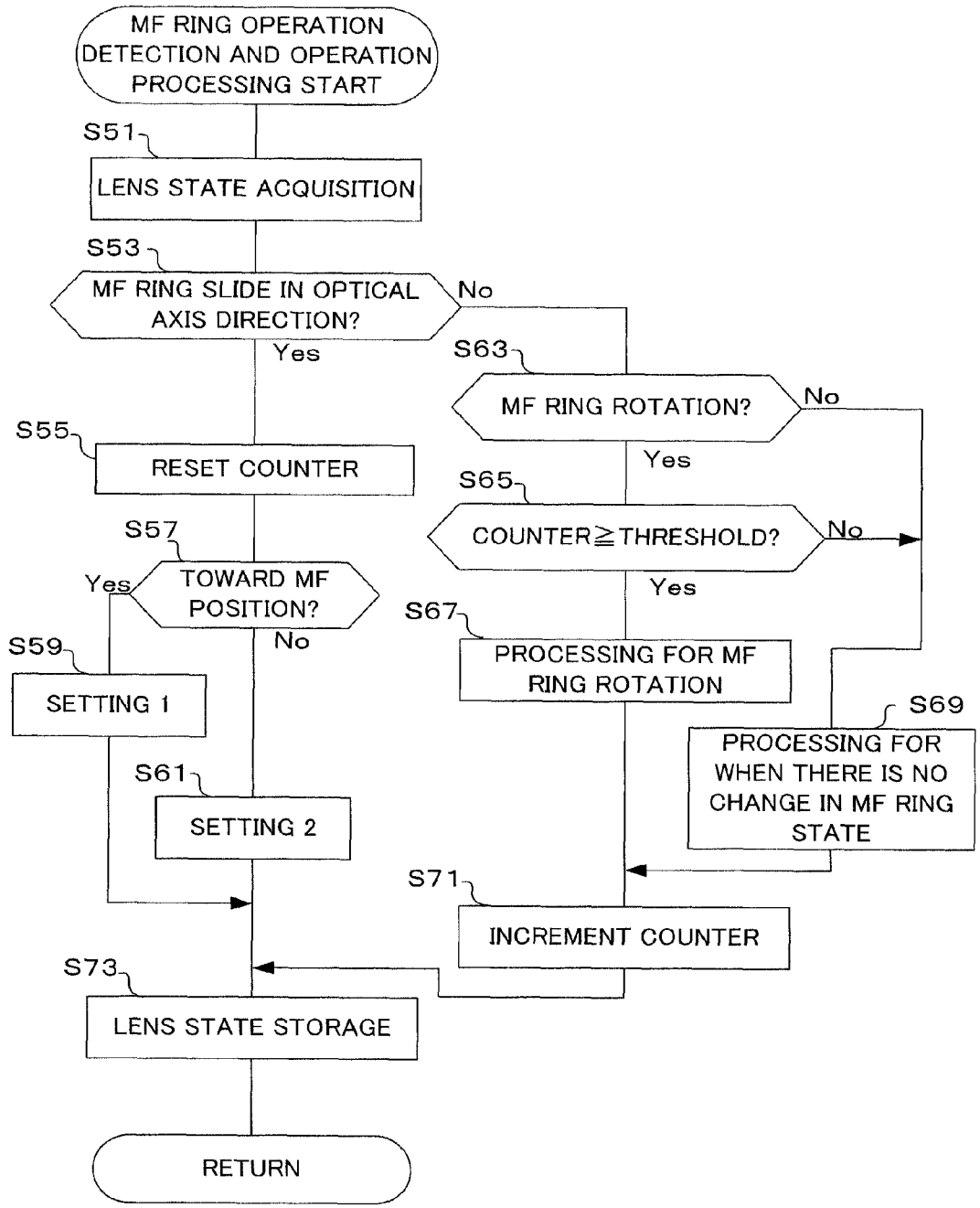
FIG. 11 is a flowchart showing MF ring operation detection and operation processing of the camera of one embodiment of the present invention.

Operation of this modified example 1 is almost the same as the flow for MF ring operation detection and operation processing in FIG. 11, with the only changes being that the MF ring in steps S53, S63, and S67 is replaced with a zoom ring, and that the MF side in step S57 is replaced with first position, and that the content of processing in steps S57, S59, S67, and S69 is changed.

In this modified example, setting 1 in step S59 is setting manual zoom mode. Also, setting 2 in step S61 is setting focal length index mode.

Also, with the processing for zoom ring rotation of step S67, in the case where manual zoom mode has been set, for example, the focal length of the zoom lens is changed so that the focal distance changes in accordance with amount of rotation of the zoom ring, moving towards a short focus with clockwise rotation of the zoom ring, and moving towards a long focus with anticlockwise rotation. Also, in the case where focal length index mode has been set, the zoom lens is changed to a predetermined focal length in accordance with an absolute position in the rotational direction.

In this way, with modified example 1 of the one embodiment of the present invention, a zoom lens is adopted and the MF ring 204 is replaced with a zoom ring. In this modified example also, processing for rotation is not carried out after movement of the zoom ring in the optical axis direction, even if the zoom ring is rotated, until a predetermined time has elapsed. As a result, when the zoom ring is subjected to slide movement in the optical axis direction it is possible to prevent erroneous operation in cases where the photographer inadvertently rotates the ring slightly, or the sensor mistakenly detects rotation.

Next, a modified example 2 of the one embodiment of the present invention will be described using FIG. 12. With this modified example 2, the MF ring 204 is replaced with an operating ring, menu display is carried out on the display monitor 105, and when the operating ring is at the second position menu selection is carried out, while when the operating ring is at the first position setting of numerical values for the selected menu is carried out.

Operation of this modified example 2 is almost the same as the flow for MF ring operation detection and operation processing in FIG. 11, with the only changes being that the MF ring in steps S53, S63, S67 and is replaced with an operating ring, and that the MF side in step S57 is replaced with first position, and that the content of processing in steps S57, S59, S67, and S69 is changed.

Figure 12A:
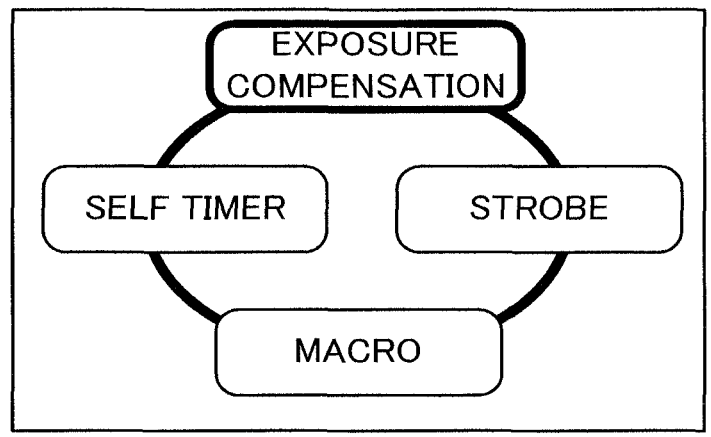
FIG. 12A and FIG. 12B are drawings showing display on a display section of the camera of one embodiment of the present invention.
Figure 12B:
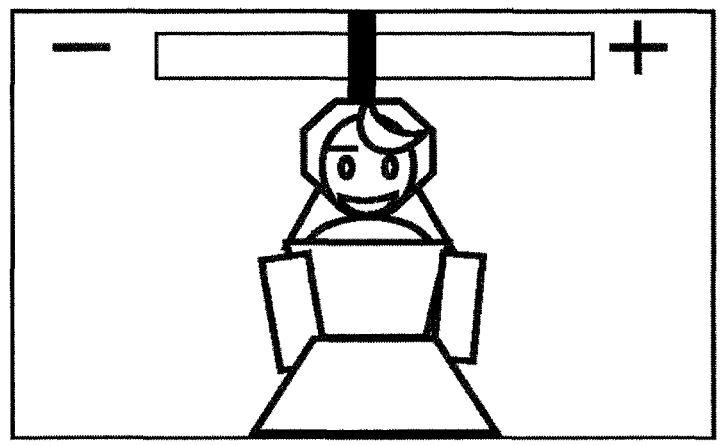

Also, setting 2 in step S61 is menu setting. In this modified example, menu selection items such as exposure compensation, self-timer, strobe, macro etc., as shown in FIG. 12A, are displayed on the menu screen. Also, with this modified example, setting 1 in step S59 is display of setting numerical values, as shown in FIG. 12B. Numerical value settings is the setting of numerical values for a menu that was selected in setting 2. For example, if exposure compensation was selected in setting 2, in setting 1 an exposure compensation value is set.

Also, with processing for rotation of the operating ring in step S67, in the case where menu setting has been set, since exposure compensation, strobe, macro, self-timer are displayed on the display monitor 105, as shown in FIG. 12A, it is possible to sequentially select a menu in line with the rotational direction of the operating ring. If the rotation stops for a predetermined time, a menu is determined. Also, in the case where numerical value selection has been set, as shown in FIG. 12B, an index is changed depending on a numerical value, in accordance with rotation direction of the operating ring.

With processing for when there is no change in the state of the operating ring, in step S69, menu display is finished if a fixed time has elapsed from setting of the timer.

In this manner, modified example 2 uses a ring member in camera settings, and as with the one embodiment and modified example 1, after movement of the ring member in the optical axis direction processing for rotation is not carried out, even if the ring member is rotated, until a specified time has elapsed.

The example shown in FIG. 12A is one example of the menu screen, but this is not limiting and it is also possible to display other menu items such as, for example, shooting mode, picture mode setting, image quality setting, MF/AF settings etc. In this case, the numerical value selection of setting 1 is not actually numerical values, but subsidiary settings for the setting items of setting 2. For example, in the case where shooting mode has been selected, program (P), aperture priority (A), shutter priority (S), and manual (M) are set in setting 1. Also, in the case where picture mode has been selected, VIVID, NATURAL, FLAT, pop art, diorama, and fantastic focus are set in setting 1. In the case where image quality mode has been selected, normal and fine are set in setting 1, and in the case where MF/AF has been selected S-AF, C-AF and MF are set in setting 1.

As has been described above, with the embodiment and modified examples of the present invention, signals generated in accordance with the rotation operation of a ring member (MF ring 204, zoom ring, operating ring) are determined and a display operation is switched (refer to S53, S57, and S61 in FIG. 11), and when a positional change in accordance with a slide operation of the ring member in the optical axis direction has been determined switching the display operation is prohibited (refer to S65 in FIG. 11). Also, in the case where a slide operation of the ring member in the optical axis direction has been detected, processing for rotation of the ring member is not carried out for a specified period (although this is not limited to a fixed period, and can also include a time for moving by a specified angle). As a result, it is possible to prevent unexpected operation at the time of switching modes even if there is instability in a photographer's hand movements.

In the embodiment and modified examples of the present invention, if movement of the ring member (MF ring 204) in the optical axis direction is detected (Yes at S53 in FIG. 11), processing in response to a rotation operation of the ring member is not carried out for a specified period (S65 in FIG. 11). However, this is not limiting, and it is also possible to stop detection of a rotation operation of the ring member during a specified period. It is therefore possible, in the flow of FIG. 11, to stop the lens state acquisition of step S51 until a specified period has elapsed.

Also, in the embodiment and modified examples of the present invention, rotation of the ring member (MF ring 204 etc.) is detected, but it is also possible to not pass the fact that there has been rotation from the interchangeable lens 200 to the camera body 100 by communication. Also, the ring member has been moved between two positions, namely a first position and a second position, but it is also possible to provide of the positions, such as a third position.

Further, with the embodiment and modified examples of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc.

Also, regarding the operation flow in the patent claims, the specification and the drawings, for the sake of convenience description has been given using words representing sequence, such as "first" and "next", but this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An optical instrument, comprising:
a ring member which is arranged to be rotatable with respect to a lens barrel, and also to slide in an optical axis direction;
a movement mechanism for slide movement of the ring member to a first position or a second position in the optical axis direction,
an encoder that generates signals in accordance with a rotation operation of the ring member;
a position detection circuit for determining positional change accompanying slide movement to the first position or the second position by the movement mechanism;
a clock counter, wherein responsive to a determination of a positional change of the ring member to the first position or the second position accompanying the slide movement, a value of the clock counter is reset, and otherwise, responsive to a determination of no positional change of the ring member to the first position or the second position accompanying the slide movement, a value of the clock counter is incremented, and
at least one controller CPU for halting processing corresponding to rotation of the ring member until a specified time has elapsed, as indicated by a value of the clock counter not exceeding a threshold even if the encoder has detected that the ring member has been rotated, and otherwise, carrying out processing corresponding to rotation of the ring member after a specified time has elapsed as indicated by a value of the clock counter exceeding a threshold.

2. The optical instrument of claim 1 further comprising:
an imaging sensor for forming a subject image; and
a display monitor for displaying the subject image based on image data that has been acquired by the imaging sensor, wherein
the at least one controller CPU causes the display monitor to display the subject image that has been formed by the imaging sensor in an enlarged live view.

3. The optical instrument of claim 1 further comprising:
a lens group of variable focal length provided within the lens barrel,
wherein a focal length of the lens group is changed in response to rotation of the ring member.

4. The optical instrument of claim 1 wherein:
settings of the optical instrument are changed in response to rotation of the ring member.

5. The optical instrument of claim 4, wherein:
items for which setting can be changed in the optical instrument are changed in response to rotation of the ring member, and
selection or determination of items for which setting can be changed in the optical instrument are carried out in response to sliding of the ring member.

6. The optical instrument of claim 1 wherein:
when the ring member is in the first position, the at least one controller CPU causes the optical instrument to be set to a manual focus mode for varying focus position in accordance with a rotation amount when the ring member is rotated manually,
while when the ring member is in the second position, the at least one controller CPU causes the optical instrument to be set to a range focus mode for changing focus position in accordance with a rotation position of the ring member with respect to the lens barrel when the ring member is rotated manually.

7. The optical instrument of claim 6 wherein:
when the range focus mode has been set,
the at least one controller CPU stores a rotation position of the ring member with respect to the lens barrel in a memory, and
the at least one controller CPU causes the optical instrument to focus at a position that corresponds to the rotation position of the ring member that has been stored in the memory.

8. The optical instrument of claim 1 further comprising:
a display monitor
wherein, in a camera setting mode, the at least one controller CPU, responsive to a determination that the ring member is at the second position, causes the display monitor to provide a display for carrying out menu selection, and responsive to a determination that the ring member is at the first position, causes the display monitor to provide a display for carrying out setting of numerical values for a selected menu.

\* \* \* \* \*